US012805502B2

(12) United States Patent
Bethshears

(10) Patent No.: US 12,805,502 B2
(45) Date of Patent: Nov. 24, 2026

(54) FORMULA FOR ENHANCING THE DETECTABILITY OF FISHING LURES

(71) Applicant: William David Bethshears, Darden, TN (US)

(72) Inventor: William David Bethshears, Darden, TN (US)

(73) Assignee: 2014 Stokes Family Trust Agreement No. 1, Dickinson, TN (US)

( * ) Notice: Subject to any disclaimer, the term of this patent is extended or adjusted under 35 U.S.C. 154(b) by 206 days.

(21) Appl. No.: 18/383,621

(22) Filed: Oct. 25, 2023

(65) Prior Publication Data

US 2024/0138392 A1 May 2, 2024

Related U.S. Application Data

(60) Provisional application No. 63/419,940, filed on Oct. 27, 2022.

(51) Int. Cl.

*A01K 99/00* (2006.01)
*G01S 7/62* (2006.01)
*G01S 15/89* (2006.01)
*A01K 85/01* (2006.01)

(52) U.S. Cl.

CPC ................ *A01K 99/00* (2013.01); *G01S 7/62* (2013.01); *G01S 15/89* (2013.01); *A01K 85/013* (2022.02); *A01K 85/018* (2022.02)

(58) Field of Classification Search

CPC ....... A01K 99/00; A01K 85/018; A01K 85/01
See application file for complete search history.

(56) References Cited

U.S. PATENT DOCUMENTS

| | | | | | |
|---|---|---|---|---|---|
| 3,359,114 | A | | 12/1967 | Witteman | |
| 5,089,277 | A | * | 2/1992 | Prochnow ............ | A01K 97/045 426/573 |
| 5,333,405 | A | * | 8/1994 | Bowles .................. | A01K 85/01 43/42.24 |
| 5,415,862 | A | * | 5/1995 | Bethshears ............ | A23K 50/80 43/42.31 |
| 5,895,805 | A | * | 4/1999 | Darling .................... | C08K 7/22 523/218 |
| 6,190,654 | B1 | * | 2/2001 | Hukee .................... | A01K 97/02 424/407 |

* cited by examiner

*Primary Examiner* — Andrew S Rosenthal
(74) *Attorney, Agent, or Firm* — Vitale, Vickrey, Niro, Solon & Gasey LLP

(57) ABSTRACT

The present invention relates to a fishing enhancer to aid a fishing enthusiast in locating a line or fishing lure by enhancing the ability of a live sonar device to detect the size, shape, positioning, and location of a fishing lure (or line) after the lure has been cast into water. The present invention relates to a mixture having a formula including a carrier component, a scent component, a visual indicator and/or active particles. The mixture is placed on a lure, bait or fishing line to, not only attract fish, but enhance the image of the object to which the mixture is applied on a live sonar image.

19 Claims, 5 Drawing Sheets

FORMULA FOR ENHANCING THE DETECTABILITY OF FISHING LURES

PRIORITY INFORMATION

The Present invention claims priority to Provisional Application Ser. No. 63/419,940 filed on Oct. 27, 2022.

FIELD OF THE INVENTION

The present invention relates to a dressing and fishing enhancer to aid in locating a line or fishing lure that enhances the ability of a fishing live sonar device to detect the size, shape, positioning, and location of a fishing lure after the lure has been cast into water.

BACKGROUND OF THE INVENTION

Various fish attractants have been formulated to attract fish and enhance the ability of both competitive and novice fishing enthusiasts to attract fish and to attract fish to bait or a lure while locating the lure in the water. One of the most significant improvements in fishing in recent years in the fishing industry is the use of sonar and, more particularly, live sonar to locate the position and orientation of fish within a body of water. Live sonar provides fishing enthusiasts with the ability to see fish swimming in the water as well as the ability to see the lure or bait on a fishing line when the line is cast into the water. The live sonar can even provide a 3D image of objects in the water. One problem with live sonar is it does not detect various types of fishing devices. In particular, sonar fishing devices have a great deal of difficulty accurately detecting and depicting the identifying characteristics of the lure, especially smaller lures or bait, when the lure is placed in the water. This is especially true of novice fishing enthusiasts who need assistance in locating a lure when it is cast into the water.

There is currently sonar detecting technology which allows a fishing enthusiast to scan fish locations and track the size, shape, and movement of fish. However, the current technology is not able to detect and provide an accurate depiction of the fishing lure in proximity to the fish. Placing the fishing lure in a desired position within proximity of a fish increases the probability of the fish sticking the lure. The ability to locate the position of a lure in the water is important because it allows the fishing enthusiast to reposition the lure into a desirable position, such as in front of the fish. Placing a lure in the desired proximity of a fish increases the probability that the fish will notice and strike the bait or lure attached to the line.

There is accordingly a present need in the fishing industry for technology which enables live sonar to collect more accurate information regarding the position of a lure in the water using live sonar. There is a need in the industry for a fishing enthusiast to detect a lure in the water using live radar as something other than an indiscernible, small image, leaving the fishing enthusiast obligated to speculate about its location and positioning of the lure. Novice fishing enthusiasts desire the ability to position the lure directly in front of a fish. This invention increases fishing enthusiast's ability to control the positioning of the lure in relation to the location and body positioning of the fish.

The present invention will improve upon the ability to present an image of a lure in the water using live sonar fishing devices by increasing the sonar's ability to detect the size, shape, positioning within the water, and location of the lure, the fishing enthusiast will have more control in moving the lure to the most optimal position. The present invention utilizes a mixture of a carrier component, a scent, a visual indicator and active particles that is applied to the bait or a lure. The active particles function to increase the accuracy of the image appearing on the display of a live image radar making the lure more detectable under the water. The improved imaging are important for novice fishing enthusiasts or guides who are working with novice fishing enthusiasts to have a more enjoyable and successful fishing experience. Factors such as improving the sonar's ability to detect the size, shape, positioning, and location of the lure or bait are improved with the application of the present invention to a lure or bait. The present invention will use a number of formulas to act in combination to enable sonar devices to accurately gather information regarding the above-listed characteristics.

SUMMARY OF THE INVENTION

The present invention relates to a mixture or dressing having a formula which acts in combination to create an environmentally acceptable formula which enables live sonar fishing devices to interact with the invention to accurately gather information regarding the size, shape, positioning, and location of a fishing lure.

The mixture of the present invention may include a carrier component, a scent component, a visual indicator and/or active particles.

It is an advantage of the present invention that the mixture when applied to a lure or bait increases the size of the detected image on the display of a live sonar system;

It is an advantage of the present invention to use a carrier component to carry the visual indicator, the scent component and active particle such that the mixture can be applied to a lure or bait;

It is yet another advantage of the present invention that the scent component be matched for a particular type of fish that is attracted to the scent;

A further advantage of the present invention consists of a visual indicator such as a glitter or other light reflecting particles that may be carried by an oil or grease. The glitter may be comprised of the light reflecting materials described in U.S. Pat. No. 4,828,829 or 5,415,862.

A final advantage of the present invention is that it comprises an active particles made of hollow microspheres or glass spheres having a small diameter where the hollow microspheres or hollow glass balls are in the range of 90 to 1000 microns.

The formulae work in combination to serve as matter which may adhere to the lure, increasing the detectability of sonar fishing devices.

BRIEF DESCRIPTION OF THE DRAWINGS

The present invention is explained in greater detail below with reference to the following drawings.

DETAILED DESCRIPTION OF THE PREFERRED EMBODIMENTS OF THE INVENTION

The enhanced detection formulation of the present invention may include several components to enhance the detectability of any object upon which the formulation is applied. The invention is used in connection with a fishing lure or bait, but it should be understood that the present invention could be used in numerous instances where it is desirable to locate an item using live sonar.

The invention utilizes hollow glass microspheres containing air which when imbedded in a grease carrier component act to reflect the sonar wave and render the object upon which the formula is applied more detectable to live sonar systems. The present invention relates to a formula for the generation of an enhanced image on a live sonar screen.

Figure 1:
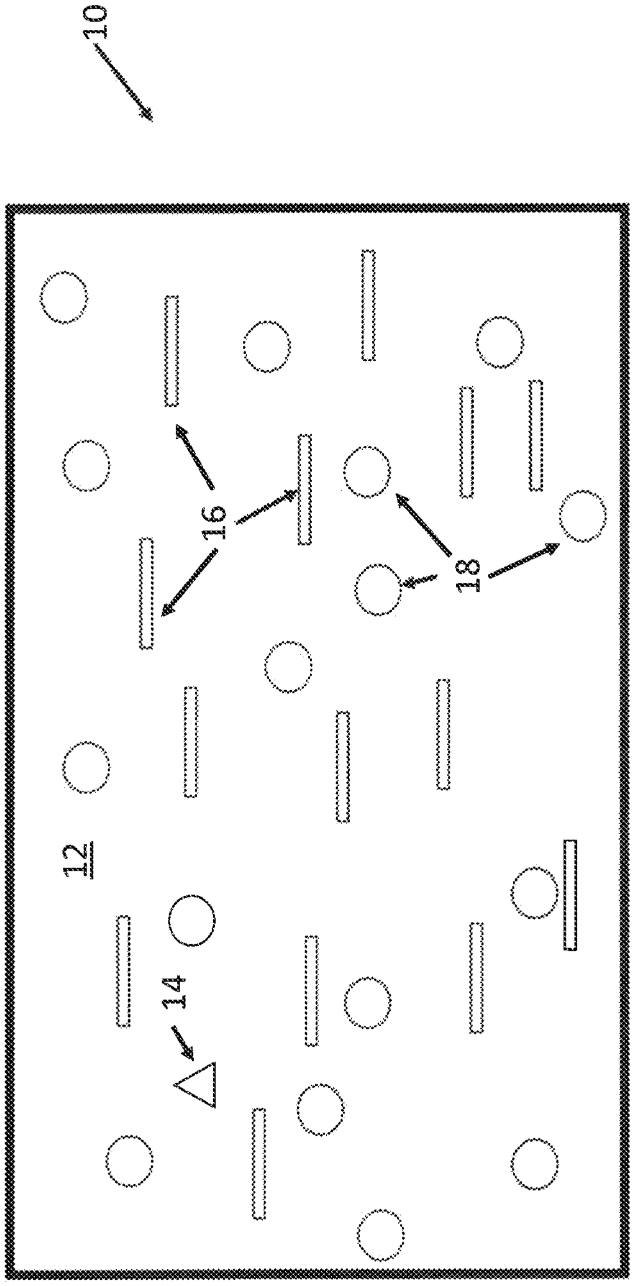
FIG. 1 shows a diagram of the composition of the mixture.

As shown in FIG. 1, the mixture 10 includes a carrier component 12. The carrier 12 may be comprised of either oil or food grade grease to serve as a base or carrier 12 for the other ingredients of the formula. The oil-based component may be comprised of mineral oil, menhaden oil, anise oil, cod liver oil, salmon oil or herring oil. The grease may be comprised of animal or vegetable-based grease. Food grade grease may be comprised of plant-based greases such as corn oil, cottonseed oil, soybean oil or other mineral oils. The grease may also be comprised of animal grease such as bacon fat, chicken fat, fish fat or the like. In the present invention, the carrier is typically comprised of a food-grade grease. The carrier acts to support and hold the other ingredients of the present invention.

The present invention embodies a base typically comprised of food-grade grease. The base acts as a binder to hold together and uniformly carry the additional ingredients which comprise the invention. The carrier ensures that the additional formulas comprising the invention do not separate after entering the water. The carrier comprises of either oil or food grade grease to serve as a base or carrier for the other ingredients of the formula. The oil-based component may be comprised of mineral oil, menhaden oil, anise oil, cod liver oil, salmon oil or herring oil. The grease may be comprised of animal or vegetable-based grease. Food grade grease may be comprised of plant-based greases such as corn oil, cottonseed oil, soybean oil or other mineral oils. The grease may also be comprised of animal grease such as bacon fat, chicken fat, fish fat or the like.

The second ingredient of the preferred formulation shown in FIG. 1 may consist of a scent application 14 which varies with respect to the desired type of fish. For example, if the fishing enthusiast is fishing for crappie fish, a garlic scent application 14 may be preferred and used in the formula. If the fishing enthusiast is fishing for game fish such as bass, an anise scent application 14 may be preferred and used in the formula. There are other scents which may be used for other types of fish such as walleye such as cod-liver oil. The carrier 12 acts to carry the second ingredient, which consists of a scent component 14 designed to attract fish, which is interchangeable based on the type of fish being pursued.

The third ingredient shown in FIG. 1 may consist of a visual indicator 16. The visual indicator 16 consists of some type of glitter or other light reflecting particles that may be carried by an oil or grease. For example, the third formula may be comprised of the light reflecting materials described in U.S. Pat. Nos. 4,828,829 and 5,415,862. U.S. Pat. Nos. 4,828,829 and 5,415,862 are incorporated by reference in their entirety in the present application. The visual indicator is an optional component of the present invention and not essential.

The visual attractants 16 aid in attracting fish by having not only a scent component 14 but having a visual component 16 as well. The visual indicator 16 is an optional component of the present invention and is not essential. The visual indicator 16 functions as a light reflectance which assists in attracting the fish to the lure. The visual indicator may include mica flakes which are chosen to be sized in the range of 0.001 inch to about 3.0 inch in length, in the range of 0.001 inch to about 3 inch in width and above about 0.001 inch in thickness. This size range permits the mica flakes to approximate the common sizes of fish Scales. This "fish Scale" appearance attracts fish to the area as it gives the illusion of an easy food source. It has also been proposed to combine the mica flakes above with a fish chum to increase the fish chums attractiveness to fish. The flashing of the mica flakes combined with the smell and taste of the chum drives the fish into a feeding frenzy. They will be Snapping at the chum particles and any lure which may be in that area.

The fourth ingredient shown in FIG. 1 is an essential component of the present invention which consists of active particles 18 made of hollow microspheres or glass spheres. The active particles 18 may have a small diameter where the hollow microspheres or hollow glass balls are in the range of 90 to 1000 microns. The hollow microspheres of the active particles 18 have air pockets which increase the detectability by live sonar fishing devices. The air pockets are essential to deflect the sonar and enhance the visual indication of the object upon which the microspheres are applied. The active particles 18 preferably may be made of plastic hollow microspheres or hollow glass balls which are in the range of 90 to 1000 microns. The air pockets of the hollow microspheres comprise a gas detectable by the sonar fishing devices. While the preferred embodiment discloses the active particles 18 consisting of a small diameter where the hollow microspheres or hollow glass balls are in the range of 90 to 500 microns, it should be understood that the microspheres may have any shape or size that is small enough to not be detected by a fish but large enough to enhance the detection of the live sonar wave. The air pockets are beneficial in that the air pockets aid the sonar in detecting the mixture when applied to a lure and enhance the visual indication of the object upon which the microspheres are applied.

The formulation for the mixture of the present invention includes the carrier 12 and the active particles 18. The preferred formula may also include a scent application 14 and visual indicator 16. In the preferred embodiment the mixture includes one pound of the carrier 12, one to two grams of a scent application 14, twenty-five grams of a visual indicator 16 and thirty grams of the active particles 18. While the preferred formulation is provided it should be understood that the ingredients may be adjusted without departing from the scope of the invention. For example, the amount of the scent application 14 or visual indicator 16 may be adjusted without departing from the scope of the invention. The active particles 18 serve as the ingredient which operates to deflect the sonar waves and enhance the detectability of any object upon which the mixture of the present invention is applied. Therefore, the amount of microspheres in the active particles 18 may be adjusted so long as the microspheres do not become detectable to the fish. The current invention is intended to be sold under the tradename "Bait Pop™"

Figure 2:
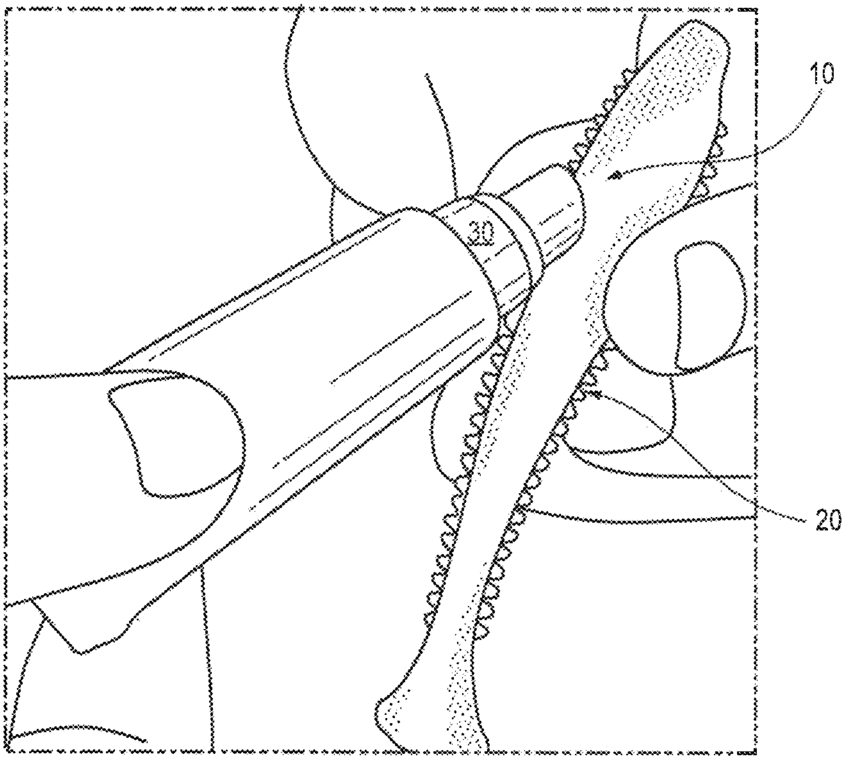
FIG. 2 shows a perspective view of the mixture of the present invention being applied to a lure.
Figure 3:
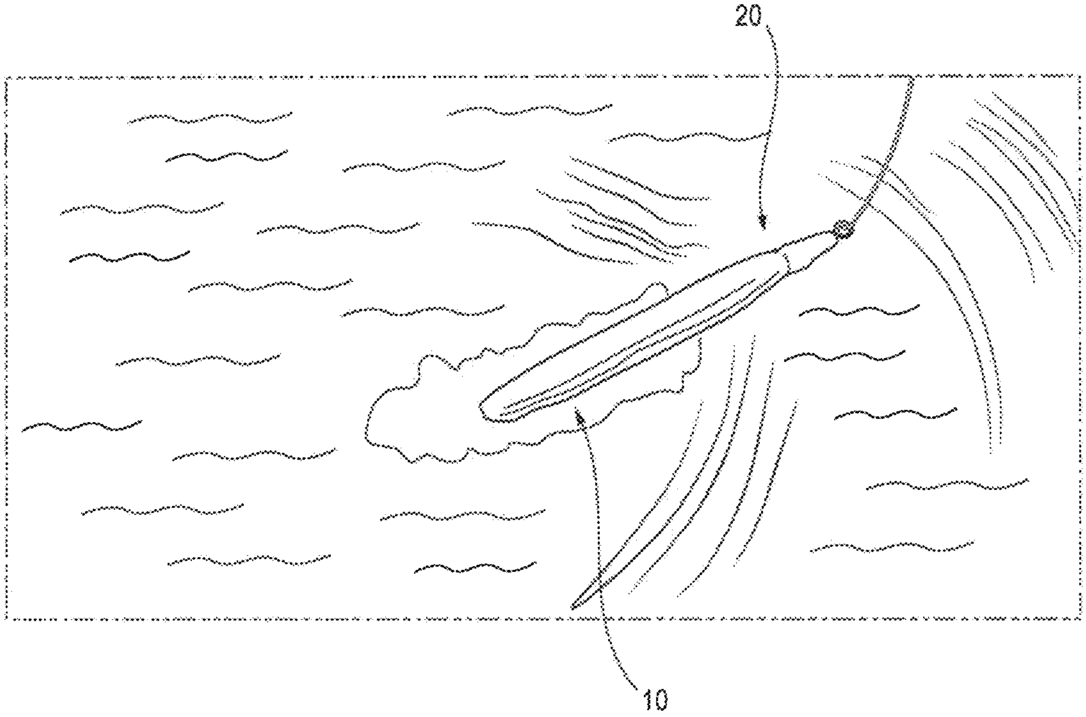
FIG. 3 shows a perspective view of the mixture of the present invention in the water after being applied to a lure.

FIG. 2 shows the formula 10 of the present invention being applied to a lure 20. The formula 10 is housed in a plastic tube 30 with a opening to allow the formula 10 to be generously applied to the lure 20. FIG. 3 shows the lure 20 containing the formula 10 as it appears in the water. The formula 22 is dissipating in the water.

Figure 4:
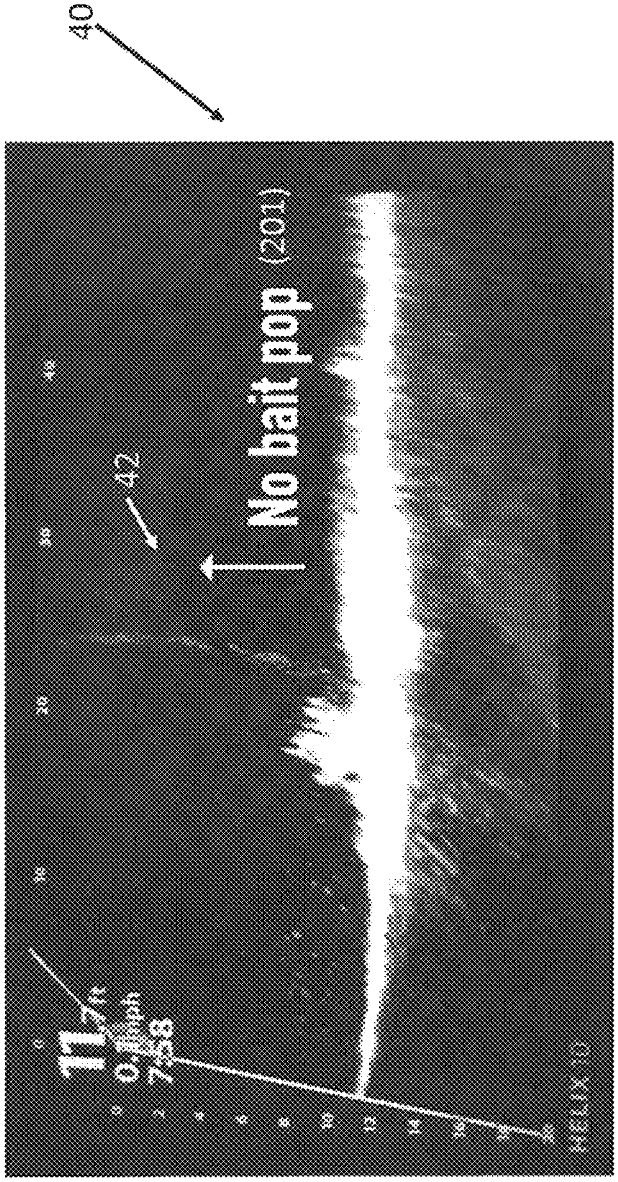
FIG. 4 shows a view of an image of the lure in the water without the present invention being applied to a lure.
Figure 5:
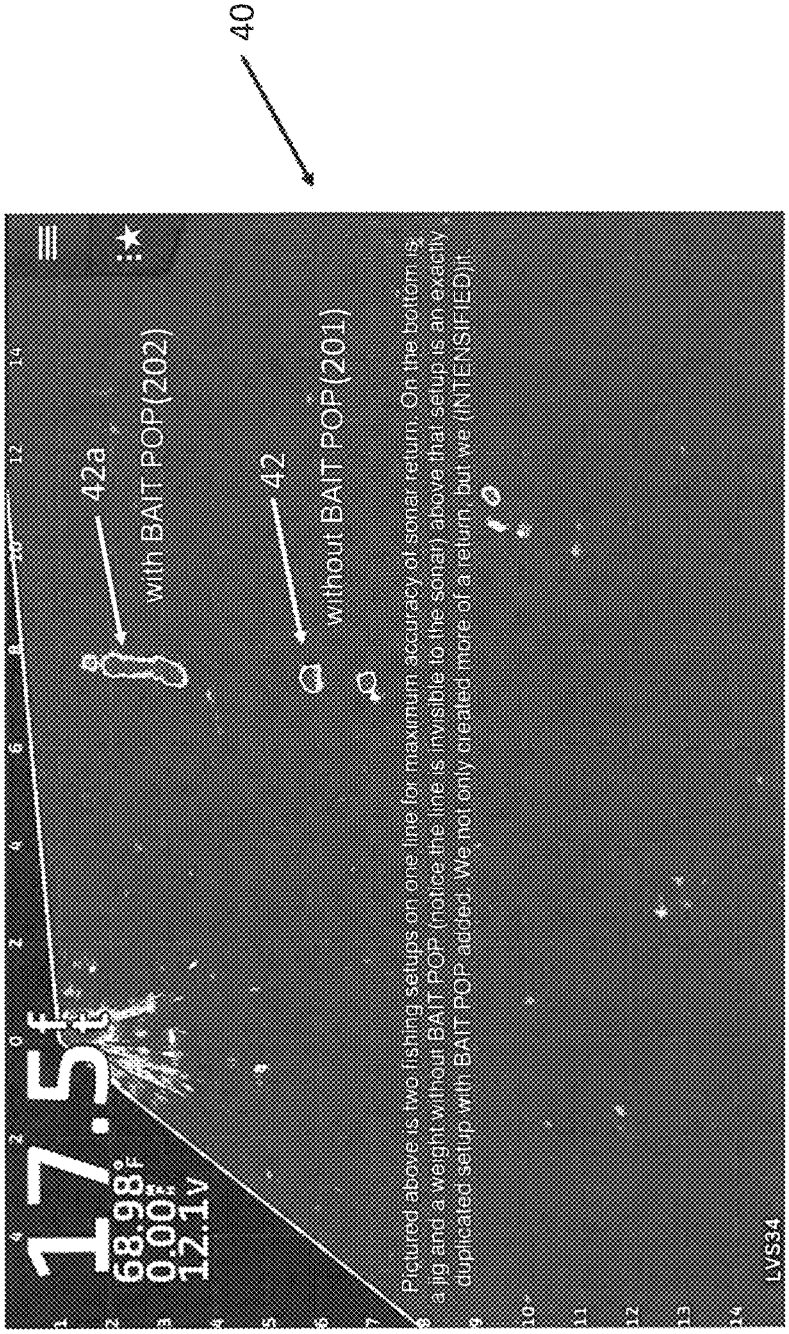
FIG. 5 shows a view of an image of the lure in the water without the present invention being applied to a lure.

The benefits of the present invention can be seen in the attached FIGS. 4 and 5. FIG. 4 depicts the image 42 a live sonar image display 40 indicating a lure 201 that has not had the mixture of the formula 10 applied to the lure 201. The image 42 is not large and difficult to detect on the display 40. FIG. 5 depicts a comparison of a lure 201 without the mixture of the present invention with a lure 202 with the mixture of the formula 10 of the present invention applied to the Lure 202. The lure 201 in the image the image 42 of the live sonar image display 40 that does not have the mixture of the formula 10 applied to the lure 201 is much smaller and not as noticeable as the lure 202 in the image the image **42*a* of the live sonar image display 40 that has the mixture of the formula 10 applied to the lure 202. As can be seen in the image, the lure 202 having the mixture of the present invention provides an enhanced image on the live sonar display as compared to the image of the lure 201 without the formula 10**.

Those of ordinary skill in the art will recognize that changes and modifications can be made to the foregoing specific embodiments of our invention without departing from its spirit and scope. We intend, therefore, to cover such changes and modifications by the following.

It should be understood, of course, that changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A mixture for application to live bait, lures or fishing line for attracting fish while presenting an enhanced image on a sonar display, comprising:

a carrier portion of a total weight of the mixture wherein the carrier acts as a binder for additional ingredients to prevent separation of a visual indicator and a plurality of active particles prior to the time the lure is introduced into a body of water;

a visual indicator portion of the total weight of the mixture dispersed in the carrier to form the mixture;

a plurality of active particles portion of the total weight of the mixture dispersed in the carrier to form the mixture wherein the active particles are configured as a plurality of hollow microspheres having air pockets capable of being detected by a live sonar device such that the ratio of the active particles to the total volume of the mixture does not impart enhanced buoyancy when placed on the live bait. lures or fishing line such that the live bait, lures or fishing line is maintained under the surface of a body of water; and the mixture having a total weight wherein the carrier consists of over 453 grams of the total weight, the visual indicator consists of less than 25 grams of the total weight, and the plurality of the active particles consists of less than 30 grams of the total weight.

2. The mixture for application to live bait, lures or fishing line for attracting fish while presenting an enhanced image on a sonar display of claim 1, wherein the carrier comprises a plant-based grease.

3. The mixture for application to live bait, lures or fishing line for attracting fish while presenting an enhanced image on a sonar display of claim 1, wherein the carrier comprises food grade grease.

4. The mixture for application to live bait, lures or fishing line for attracting fish while presenting an enhanced image on a sonar display of claim 1, wherein the carrier is selected from the group consisting of mineral oil, menhaden oil, anise oil, cod liver oil, salmon oil and herring oil.

5. The mixture for application to live bait, lures or fishing line for attracting fish while presenting an enhanced image on a sonar display of claim 1, wherein the visual indicator comprises a light reflecting material.

6. The mixture for application to live bait, lures or fishing line for attracting fish while presenting an enhanced image on a sonar display of claim 5, wherein the light reflective material comprises mica flakes which are sized in the range of 0.001 inch to about 3.0 inch in length.

7. The mixture for application to live bait, lures or fishing line for attracting fish while presenting an enhanced image on a sonar display of claim 1, wherein visual indicator includes a metallic-colored component.

8. The mixture for application to live bait, lures or fishing line for attracting fish while presenting an enhanced image on a sonar display of claim 1, wherein the active particles comprise a plurality of hollow plastic microspheres having a diameter in the range of 90 to 1000 microns.

9. The mixture for application to live bait, lures or fishing line for attracting fish while presenting an enhanced image on a sonar display of claim 1, wherein the active particles comprise a plurality of hollow glass balls having a diameter in the range of 90 to 1000 microns.

10. The mixture for application to live bait, lures or fishing line for attracting fish while presenting an enhanced image on a sonar display of claim 4, wherein the visual indicator comprises a light reflective material.

11. The mixture for application to live bait, lures or fishing line for attracting fish while presenting an enhanced image on a sonar display of claim 10, wherein the light reflective material is made of mica flakes which are sized in the range of 0.001 inch to about 3.0 inch in length.

12. The mixture for application to live bait, lures or fishing line for attracting fish while presenting an enhanced image on a sonar display of claim 11, further comprising a scent portion of the total weight of the mixture, wherein the scent portion is selected from the group consisting of garlic oil, anise oil and cod liver oil.

13. The mixture for application to live bait, lures or fishing line for attracting fish while presenting an enhanced image on a sonar display of claim 12, wherein the active particles comprise a plurality of hollow plastic microspheres having a diameter in the range of 90 to 500 microns.

14. The mixture for application to live bait, lures or fishing line for attracting fish while presenting an enhanced image on a sonar display of claim 12, wherein the active particles comprise a plurality of hollow glass balls having a diameter in the range of 90 to 1000 microns.

15. The mixture for application to live bait, lures or fishing line for attracting fish while resenting an enhanced image on a sonar display of claim 1, wherein the mixture of the carrier, the scent portion, the visual indicator and the active particles are mixed at the ratio of one pound of the carrier, between one to two grams of a scent portion, twenty-five grams of a visual indicator and thirty grams of the active particles.

16. The mixture for application to live bait, lures or fishing line for attracting fish while presenting an enhanced image on a sonar display of claim 14, wherein the mixture of the carrier, the scent portion, the visual indicator and the active particles are mixed at the ratio of one pound of the carrier, between one to two grams of a scent portion, twenty-five grams of a visual indicator and thirty grams of the active particles.

17. The mixture for application to live bait, lures or fishing line for attracting fish while presenting an enhanced image on a sonar display of claim 15, wherein the mixture of the carrier, the scent portion the visual indicator and the active particles are mixed at the ratio of one pound of the carrier, between one to two grams of a scent portion, twenty-five grams of a visual indicator and thirty grams of the active particles.

18. A mixture for application to live bait, lures or fishing line for attracting fish while presenting an enhanced image on a sonar display, comprising:

a carrier wherein the carrier acts as a binder for additional ingredients to prevent separation of the additional ingredients prior to the time the lure is introduced into a body of water wherein said carrier is selected from the group consisting of mineral oil, menhaden oil, anise oil, cod liver oil, salmon oil and herring oil;

a visual indicator dispersed in the carrier to form a mixture the visual indicator comprising a light reflective material;

a plurality of active particles dispersed in the carrier mixture to form a mixture wherein the plurality of active particles are configured as hollow microspheres having a diameter in the range of 90 to 500 microns wherein the microspheres form air pockets capable of being detected by a live sonar device, such that the ratio of the active particles to the total volume of the mixture has a non buoyant density in does not impart enhanced buoyancy when placed on the live bait, lures or fishing line such that the live bait. lures or fishing line is maintained under the surface of a body of water; and the mixture having a total weight wherein the carrier consists of over 453 grams of the total weight, the visual indicator consists of less than 25 grams of the total weight, and the plurality of the active particles consists of less than 30 grams of the total weight.

19. The mixture for application to live bait, lures or fishing line for attracting fish while presenting an enhanced image on a sonar display of claim 18 wherein the light reflective material is made of mica flakes which are sized in the range of 0.001 inch to about 3.0 inch in length.

* * * * *